United States Patent

[11] 3,559,908

[72] Inventor Hanjiro Esashi
Miyagi-ken, Japan
[21] Appl. No. 691,324
[22] Filed Dec. 18, 1967
[45] Patented Feb. 2, 1971
[73] Assignee Sony Corporation
Tokyo, Japan
a corporation of Japan
[32] Priority Dec. 30, 1966
[33] Japan
[31] 42/209

[54] ENDLESS TAPE CARTRIDGE

9 Claims, 8 Drawing Figs.

[52] U.S. Cl. ........ 242/55.19, 179/100.2
[51] Int. Cl. ........ B65h 17/48
[50] Field of Search ........ 242/55.19(A), 55.19; 179/100.22; 352/78, 128; 274/11

[56] References Cited

UNITED STATES PATENTS 2,894,700 7/1959 Roberts et al. ........ 242/55.13
2,921,787 1/1960 Cousino ........ 242/55.19(A)
2,945,692 7/1960 Maeder ........ 226/93
3,140,837 7/1964 Cailliot ........ 242/55.19(A)
3,285,527 11/1966 Cole, Jr. ........ 242/55.19(A)

OTHER REFERENCES

German Printed Publication 1,124,347, 2-1962, Jernberg 242-55.19(A)

*Primary Examiner*—Billy S. Taylor
*Attorney*—Hill, Sherman, Meroni, Gross & Simpson

ABSTRACT: An endless tape cartridge for magnetic recording and reproducing, including first and second hubs rotatably mounted in a cartridge, and an endless tape wound on the first hub. The second hub may be selectively driven to move the endless tape forward fast. The tape is driven with a normal capstan and pinch roller during normal use but the second hub is utilized to move the endless tape forward when the tape is to be moved to a new position in a fast manner. In one modification a pinch roller engages the tape and presses it against the second hub and in a second modification the frictional engagement of the tape with the second hub moves it forward.

INVENTOR.
HANJIRO ESASHI

BY Hill, Sherman, Meroni, Gross & Simpson
ATTORNEYS

INVENTOR.
HANJIRO ESASHI

BY Hill, Sherman, Meroni, Gross & Simpson ATTORNEYS

INVENTOR.
HANJIRO ESASHI

BY Hill, Sherman, Meroni, Gross & Simpson ATTORNEYS

ENDLESS TAPE CARTRIDGE

BACKGROUND OF THE INVENTION

1. Field of the Invention

This invention relates to an endless tape cartridge, and in particular to an endless tape cartridge which can be used with tape recorder designed for use with standard reel-to-reel type tape cartridges.

2. Description of the Prior Art

In recent years miniature reel-to-reel type tape cartridges, for example such as Philips type cassettes, have become popular. These cartridges are small and easy to handle. However, endless tape cartridges have many advantages for recording and playback and are relatively trouble free. Endless tape cartridges previously proposed have not been satisfactory.

The present invention relates to an endless tape cartridge which may be used with conventional tape recorders designed for use with standard reel-to-reel tape cartridges.

Prior endless tapes could not be driven at high speed and this has made it inconvenient to use them. The present invention allows fast forwarding of the endless tape with a fast forward mechanism in the endless tape cartridge.

Accordingly, one object of this invention is to provide an endless tape cartridge which can be used with conventional tape recorders.

Another object of this invention is to provide a type of reel-to-reel type endless tape cartridge which allows fast forwarding of the tape.

Still another object of this invention is to provide an endless tape cartridge which produces little wow and flutter.

Other objects, features and advantages of this invention will become apparent from the following description when taken in conjunction with the accompanying drawings.

DESCRIPTION OF THE PREFERRED EMBODIMENTS

Figure 1:
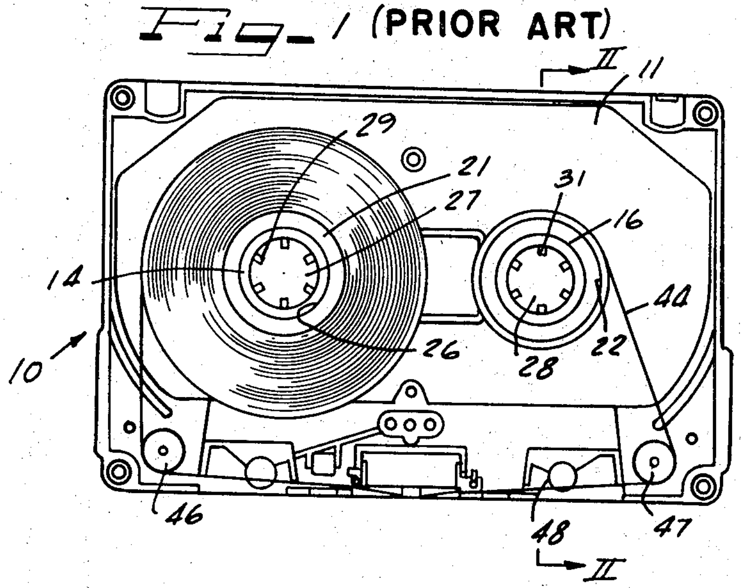
FIG. 1 (PRIOR ART)
FIG. 1 is a plan view schematically illustrating one example of a prior art type of reel-to-reel tape cartridge with its cover removed.
Figure 2:
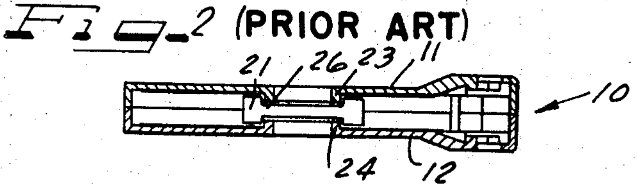
FIG. 2 (PRIOR ART)
FIG. 2 is a cross-sectional view taken along the line II–II in FIG. 1.
Figure 3:
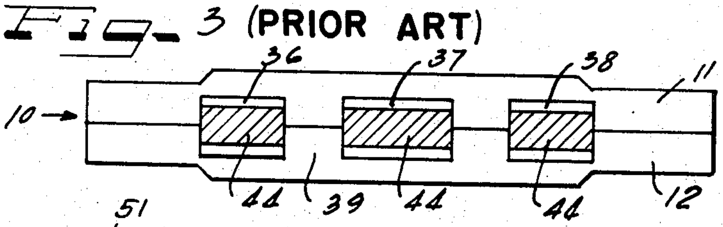
FIG. 3 (PRIOR ART)
FIG. 3 is a front view of the cartridge shown in FIG. 1.
Figure 4:
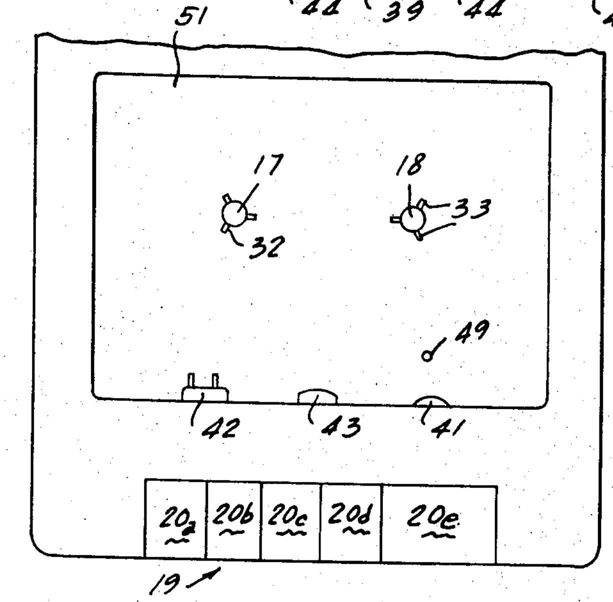
FIG. 4 (PRIOR ART)
FIG. 4 is a plan view schematically showing a portion of a cartridge-type tape recorder on which the cartridge is mounted.

FIGS. 1 to 3 illustrate a conventional reel-to-reel type tape cartridge. A reel-to-reel type tape cartridge designated generally as 10 has a substantially flat configuration, and is formed of upper and bottom case members 11 and 12. Two apertures 14 and 16 are formed through members 11 and 12 and positioned to align with supply and takeup reel shafts 17 and 18 of a cartridge type tape recorder 19 (Shown in FIG. 4). Control buttons 20*a*—*e* are mounted on recorder 19 and allow various modes of operation to be chosen. A pair of reels 21 and 22 are rotatably mounted in the cartridge 10.

As shown in FIG. 2, projections 23 ad 24, formed on the inside of the upper and bottom case members 11 and 12, engage annular recesses 26 formed in both faces of the reels 21 and 22 to hold them rotatably in position. Each reel 21 and 22 has a central aperture 27 and 28 and teeth 29 and 31 projecting into the openings for engagement with one or more projecting teeth lugs 32 and 33 of the supply and takeup reel shafts 17 and 18 of the cartridge type tape recorder 19 to permit the reels to be driven by the reel shafts when mounted on the tape recorder 19.

The cartridge 10 has windows 36, 37 and 38 formed in one side 39 (See FIG. 3), through which a pinch roller 41, an erasing head 42 and a recording and reproducing head 43 of the tape recorder 19 are urged into contact with tape 44.

During rewinding of the tape 44 the supply reel shaft 17 is driven by means of a suitable drive mechanism (not shown) in a rewinding direction at high speed, during which the pinch roller 41, the erasing head 42 and the recording and reproducing head 43 are disengaged from the tape 44. During fast forwarding of the tape 44, the takeup reel shaft 18 is driven by a drive mechanism (not shown) in a forward direction. Also, in this case, the pinch roller 41, the erasing head 42 and the recording and reproducing head 43 are held out of contact with the tape 44. Tape guide pulleys 46 and 47 are mounted in the cartridge near the corners. An aperture 48 is formed in the cartridge through which a capstan 49 of the tape recorder 19 is received.

In actual use the reel-to-reel type tape cartridge 10 is mounted on the cartridge type tape recorder 19 on its recessed portion 51 with the supply and takeup reel shafts 17 and 18 being received into the apertures 27 and 28 of the reels 21 and 22, respectively, to engage engage the projections 29 and 31 with the teeth 32 and 33. The erasing head 42 and the recording and reproducing head 43 are urged into contact with the tape 44 through the windows 36 and 37 of the tape cartridge 10 and the pinch roller 41 is also brought into contact with the capstan 49 through the window 38 with the tape 44 gripper therebetween. Under such conditions, the tape 44 is driven for recording or reproducing in a known manner.

The present invention comprises an endless tape cartridge which can be used with the conventional cartridge type tape recorder 19. An endless tape reel having a centrally disposed aperture is rotatably mounted on either of the supply or takeup reel shafts 17 and 18. Another reel or hub of the cartridge is mounted on the other shaft 17 or 18 and a fast forwarding mechanism is incorporated.

Figure 5:
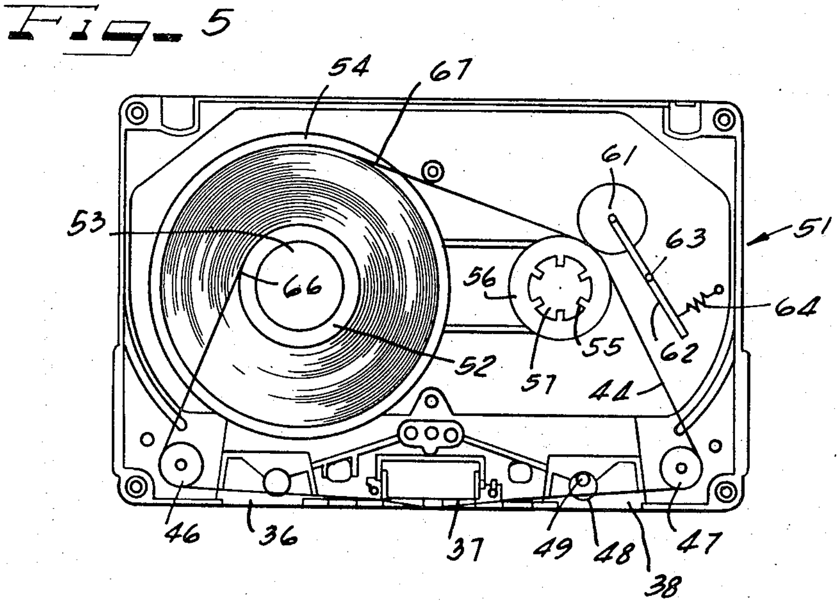
FIGS. 5 to 7 are plan views schematically illustrating various modifications of this invention.

FIG. 5 shows a cartridge 51. Those components in this invention which are the same or similar to the conventional ones of FIGS. 1—3 are identified by the same reference numerals.

An endless tape reel 52 is to be mounted on the supply reel shaft 17 of the tape recorder 19 and is mounted in cartridge 51. The endless tape reel 52 consists of a spool with a flange 54 on one side thereof and has a central aperture 53 for engagement with the supply reel shaft 17. The reel 52 has no teeth and the central aperture 53 is of a size so that the reel loosely engages the supply reel shaft 17 to permit the reel 52 to be rotatable thereon. Thus, rotation of the supply reel shaft 17 is not transmitted to the endless tape reel 52. A hub 56 has a central aperture 57 and is mounted on the takeup reel shaft 18 of the tape recorder 19. Hub 56 has teeth 55 for engagement with the projections 33 of shaft 18. Hub 56 is held in position between the upper and bottom walls of the cartridge 51. The hub 56 may be a reel such as 52 except that it has the teeth 55. A roller 61 which is rotatably mounted inside the cartridge 51 on an arm 62 is pivotally attached by pin 63 to the cartridge. A spring 64 biases arm 62 to urge the roller 61 to normally press the endless tape 44 against the hub 56 from the outside of the loop of the tape, as illustrated, to drive the tape during fast forward.

The endless tape 44 wound on the reel 52 is drawn out from the innermost winding of the tape on the spool at 66 and is taken up on the reel 52 on the outermost winding 67.

The cartridge 52 is placed on machine 19 and during recording or reproducing the endless tape 44 is drawn out from the reel 52 with the capstan 49 and the pinch roller 41 because the tape is gripped between them. The tape 44 is drawn across the guide drums 46 and 47 and between the hub 56 and roller 61. Tension in the endless tape 44 rotates the reel 52 to cause it to take up the tape. Since the endless tape 44 is driven only by the capstan 49 of the tape recorder 19 and the pinch roller 41, the tape travels very smoothly.

For fast forwarding of the endless tape 44 a fast forward button 20*d* of the tape recorder 19 is pushed. This causes the erasing head 42, the recording and reproducing head 43 and the pinch roller 41 to disengage the endless tape 44. Simultaneously, the takeup reel shaft 18 with the hub 56 mounted thereon, is driven at a high speed by the recorder to that the endless tape 44 is transported in a forward direction by the driving of the hub 56 and the roller 61. This may be continued until the desired portion of the tape is reached. Thus, the tape is driven by capstan 49 and pinch roll 41 during normal operations, but may be rapidly advanced by hub 56, shaft 18 and roller 61 during fast forward mode.

Figure 6:
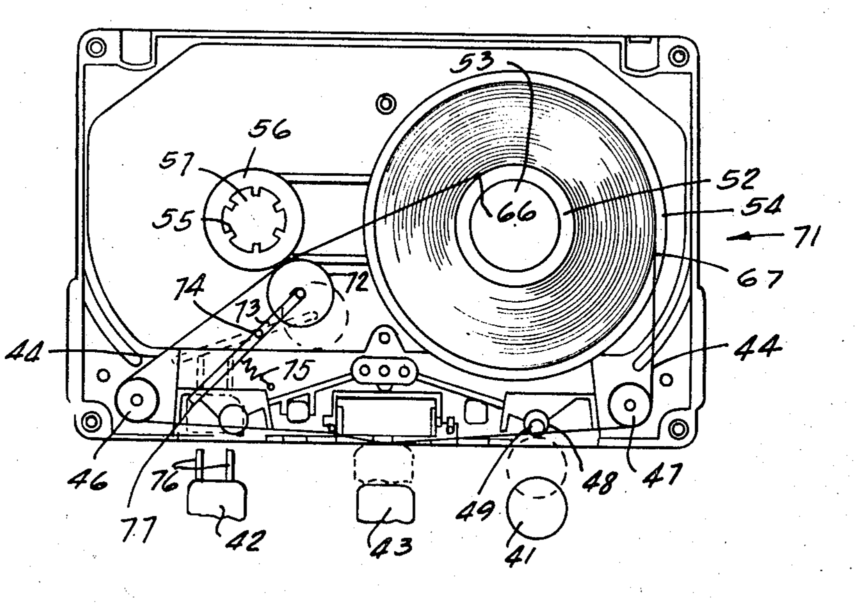

FIG. 6 illustrates a modification with a cartridge 71 which has an endless tape reel 52, a hub 56 and a roller 72 similar to those of FIG. 5 except tape reel 52 is mounted on the takeup reel shaft 18 while the hub 56 is mounted on the supply reel shaft 17. The roller 72 engages tape 44 and hub 56 and is rotatably mounted on arm 73. Arm 73 is pivotally attached by pin 74 in the cartridge. A spring 75 biases the roller 72 toward the hub.

Projections 76 are attached to the front surface of the erasing head 42 at the lower edge so that they miss the tape. The projections 76 push one end 77 of arm 73 to disengage the roller 72 from the hub 56 during recording and reproducing.

During recording and reproducing the endless tape 44 is drawn out from the reel 52 by the driving of the capstan 49 and the pinch roller 41 with the tape 44 gripper between. The tape moves between the hub 56 and the roller 72 and over the tape guide rollers 46 and 47. The tension of the tape 44 rotates the reel 52 to take up the tape 44 on the spool. At this time the projections 76 push the end 77 of the arm 73 to disengage the roller 72 from the hub 56. Since the endless tape 44 is driven only by the capstan 49 of the tape recorder 19 and the pinch roller 41, the endless tape travels very smoothly.

For fast forwarding of the endless tape 44 the tape recorder 19 is put in its rewinding condition by pushing a button 20*c* to disengage the erasing head 42, the recording and reproducing head 43 and the pinch roller 41 from the tape 44. The projections 76 move out to allow the roller 72 to press the tape 44 against the hub 56. The supply reel shaft 17 is driven in a rewinding direction at high speed, and the endless tape 44 is transported in the forward direction at high speed by the driving of hub 56 and roller 72.

Figure 7:
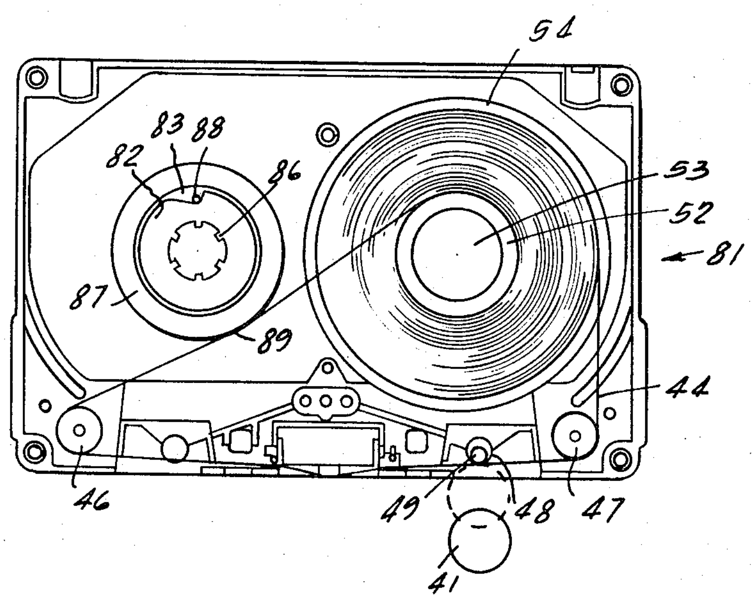
Figure 8:
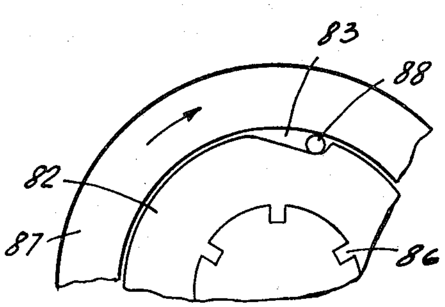
FIG. 8 is an enlarged view showing the principal portion of the modifications shown in FIG. 7.

FIGS. 7 and 8 illustrate another embodiment of the invention. An endless tape reel 52 of the same construction as described, is mounted in a cartridge 81. A similar hub 82 has a recess 83 of a triangular configuration and is also mounted in the cartridge. The hub 82 has projections 86 which mate with lugs 32 of shaft 17 of the recorder 19. A ring 87 is mounted on hub 82 and is normally held in frictional contact with the endless tape 44. A ball 88 formed of a hard material such, for example, as steel, is movably mounted in the recess 83. During recording and reproducing the endless tape 44 is drawn out from the reel 52 by the capstan 49 and the pinch roller 41, and is drawn across a frictional engaging face 89 of the ring 87 and over the tape guide rollers 46 and 47. Tension of the tape rotates the reel 52 to take up the tape 44. In this case, since the supply reel shaft 17 does not rotate, the ring 87 freely rotates with the movement of the tape 44 because the ball 88 does not lock it to the hub 82. The endless tape 44 is driven only by the capstan 49 and the pinch roller 41 held in driving contact so it moves very smoothly.

For fast forwarding operation of the endless tape 44 the rewinding switch 20*c* is pushed to put the tape recorder 19 into its rewinding condition. In this case, the supply reel shaft 17 with the hub 82 mounted thereon rotates in a rewinding direction at a high speed and consequently the ball 88 in the recess 83 is pressed against the inner wall of the ring 87 by centrifugal force to engage the hub 82 with the ring 87 through the ball 88 so that they rotate together Rotation of the ring 87 causes the endless tape 44 to be transported at high speed due to its frictional contact with the ring at face 89.

Although the pinch roller is not mounted in the cartridge shown, this invention is applicable to cartridges which have the pinch roller mounted therein. Flange 54 of reel 52 may be eliminated if desired.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim:

1. A cartridge for an endless tape machine having at least one drive shaft, comprising:
   - a spool rotatably mounted in the cartridge;
   - an endless loop of tape wound on the spool;
   - an access opening formed through the cartridge and a portion of said tape available to the access opening so that the tape machine may be operatively associated therewith;
   - a drive capstan of said tape machine engageable with said tape for driving said tape at a first speed in a first mode of operation;
   - a first pinch roll associated with said capstan and in a first operative position of said tape machine engageable to press said tape against said capstan to move said tape for operation with said tape machine;
   - a hub rotatably supported in the cartridge away from said spool and said hub being shaped to be received on said shaft of the tape machine; and
   - said tape engageable with the periphery of said hub so as to be driven at second speed when the tape machine is in a second mode of operation.

2. Apparatus according to claim 1 comprising a second pinch roll means movably mounted in said cartridge and in operative association with the hub so as to press said tape against the periphery of said hub.

3. Apparatus according to claim 2 in which said pinch roll mean includes an arm rotatably supporting a second pinch roll and means pivotally attaching said arm to the cartridge.

4. Apparatus according to claim 3 in which said pinch roll means further includes spring biasing means attached to said arm to urge the second pinch roll against the hub.

5. Apparatus according to claim 3 wherein at least a portion of the arm is available through said access opening for operative association with the tape machine.

6. Apparatus according to claim 1 wherein said hub is formed with an outer ring in frictional engagement with the tape, an inner portion of the hub, and a clutch formed between the outer ring and the inner portion of the hub.

7. Apparatus according to claim 6 wherein the clutch comprises a tapered opening formed between the ring and the inner portion of the hub and a locking means in the tapered opening for selectively locking the ring and inner portion.

8. Apparatus according to claim 7 wherein the locking means comprises a round member.

9. Apparatus according to claim 8 wherein the locking means comprises a sphere.